United States Patent [19]

Noguchi et al.

[11] Patent Number: 4,831,479
[45] Date of Patent: May 16, 1989

[54] PIVOT SUPPORT STRUCTURE FOR MAGNETIC HEAD ASSEMBLY

[75] Inventors: Ichiro Noguchi, Nagaoka; Kazuo Kobayashi, Furukawa; Toru Sawada, Furukawa; Masao Okita, Furukawa; Yasunari Takayama, Yokohama; Kazuo Kozumi, Furukawa, all of Japan

[73] Assignee: Alps Electric Co., Ltd., Japan

[21] Appl. No.: 210,202

[22] Filed: Jun. 20, 1988

Related U.S. Application Data

[63] Continuation of Ser. No. 892,950, Aug. 4, 1986, abandoned.

[30] Foreign Application Priority Data

Sep. 10, 1985 [JP] Japan .................................. 60-198427
Oct. 30, 1985 [JP] Japan .................................. 60-241653

[51] Int. Cl.$^4$ .......................... G11B 5/54; G11B 21/22
[52] U.S. Cl. .................................... 360/105; 360/97.01
[58] Field of Search ................... 360/105, 97, 99, 104, 360/106

[56] References Cited

U.S. PATENT DOCUMENTS

| | | | |
|---|---|---|---|
| 4,247,877 | 1/1981 | Keller et al. | 360/105 |
| 4,306,260 | 12/1981 | Maeda et al. | 360/105 |
| 4,630,155 | 12/1986 | Hasegawa et al. | 360/105 |
| 4,633,352 | 12/1986 | Mizoguchi et al. | 360/104 |
| 4,647,998 | 3/1987 | Onohara et al. | 360/105 |
| 4,651,243 | 3/1987 | Daste et al. | 360/104 |
| 4,651,245 | 3/1987 | Karno | 360/105 |
| 4,704,646 | 11/1987 | Okita | 360/105 |

OTHER PUBLICATIONS

Reiderbach, "Combination Suspension-Lead Cable for a Multi-Gap Read Write Head", IBM TDB, vol. 22, No. 4, Sep. 79, pp. 1602–1603.

Primary Examiner—Stuart N. Hecker
Assistant Examiner—David J. Severin
Attorney, Agent, or Firm—Guy W. Shoup; Paul J. Winters; Stephen L. Malaska

[57] ABSTRACT

A magnetic head assembly comprises a carriage on which a first magnetic head is mounted for performing read/write with respect to one face of a disk, a second magnetic head also mounted on the carriage opposite to the first magnetic head for performing read/write with respect to the other face of the disk, and a hold case coupled turnably via a leaf hinge spring to the carriage, wherein the first magnetic head is attached via a gimbal spring to the carriage, and the second magnetic head is secured to the hold case, and is characterized in that the carriage has a support portion abutting directly on the hold case inclusive of the leaf hinge spring to support the same, so that the hold case is supported turnably with the support portion serving as a supporting point, whereby the reference plane of the hold case is defined by the support portion, so that accuracy can be ensured for the reference plane of the second magnetic head with respect to the disk and an enhancement of the follow-up performance can contribute to an improvement of the read/write characteristic.

5 Claims, 1 Drawing Sheet

PIVOT SUPPORT STRUCTURE FOR MAGNETIC HEAD ASSEMBLY

This application is a continuation of application Ser. No. 06/892,950, filed Aug. 4, 1986 now abandoned.

BACKGROUND OF THE INVENTION

1. Field of the Invention

This invention relates to a magnetic head assembly of a disk drive of the double-sided recordable type wherein information can be read from and written on either side of a disc-shaped magnetic recording medium.

2. Description of the Prior Art

In disk drives of the double-sided recordable type wherein the readout and write operation of a disc-shaped magnetic recording medium (hereinafter referred to simply as a disk) can be performed on either side, there are known three systems classified depending upon the mounting of gimbal spring of at least one of two magnetic heads: the lower-fixed upper-movable system wherein the gimbal spring is disposed on the side of an upper hold case, the upper-fixed lower-movable system wherein the gimbal spring is disposed on the side of a lower carriage, and the upper-movable lower-movable system wherein the gimbal springs are disposed on both the carriage and hold case. Among these systems, the lower-fixed upper-movable system is widely adopted because the carriage disposed on the lower side is guided directly by a guide rod so that a reference plane of the disk can easily be defined. Contrarily, the upper-fixed lower-movable system has the problem that the reference plane is difficult to define when the hold case is supported pivotably on the carriage. Additionally, though having good tracking performance, the upper-movable lower-movable system is rarely adopted actually because the reference plane is as difficult to define as in the upper-fixed lower-movable system.

Compared with the first-mentioned lower-fixed upper-movable system, the second-mentioned upper-fixed lower-movable system has difficulty fixing the reference plane, but seems to have better tracking performance; thus, its progress is expected. That is, because the hold case on the upper side has two movable portions in the gimbal spring and in the coupling portion of the hold case with the carriage, the lower-fixed upper-movable system causes a secondary lag in the tracking operation of the two movable portions if there is a deformation of the disk; thus its tracking performance is degraded. On the contrary, in the upper-fixed lower-movable system, the position of the magnetic head on the upper side fluctuates little and the movable portion of the magnetic head on the lower side exists only in the gimbal spring; thus, there appears no lag in the secondary tracking operation of this system seems to be advantageous in terms of the tracking performance. Under the foregoing circumstances one invention has been proposed in Japanese Patent Application Laid-Open No. 57-147160. This prior system is illustrated in FIG. 2.

The magnetic head support mechanism shown in FIG. 2 is composed principally of an arm (hold case) 34 on which a magnetic head 32 is mounted and a carriage 36 on which a magnetic head 33 is mounted. The arm 34 is attached turnably by means of a plate spring-like hinge 35 projecting from a side portion 36a of the carriage 36, and a given load pressure is created by means of a coil spring 37 coupled to an upper portion 36b of the carriage 36. The upper magnetic head 32 is fixed directly on the under surface of the arm 34, and the lower magnetic head 33 is attached via a gimbal plate 38 to the upper surface of the carriage 36, so that the upper magnetic head 32 and lower magnetic head 33 are opposed mutually with a disk (flexible disk) 31 put therebetween. In a thru-hole formed in a lower portion 36c of the carriage 36 at a position corresponding to the under surface of the gimbal plate 38, there is provided a support plate spring 41 having a pivot 40 at its point, which pushes the gimbal plate 38 toward the disk 31 form below.

In the magnetic head support mechanisms as above of the prior system, accuracy cannot be ensured with respect to the reference plane of the magnetic head 32 because positioning of the arm 34 is achieved only by means of the plate spring-like hinge 35. Thus, even when the tracking performance of the magnetic heads 32 and 33 is enhanced, the overall read/write characteristic cannot be improved if the degree of accuracy of the reference plane falls.

With such conventional magnetic head support construction, since the pivot 40 supporting the gimbal plate 38 is supported by the leaf spring 41, the lower magnetic head 33 is sunk or lowered after the upper and lower magnetic heads 32, 33 have been brought into engagement with each other via the disk 31, and in this lowered position the resilient force of the leaf spring 41 and the pressing force of the coil spring 37 are balanced or become stable. In this stable position, the upper and lower magnetic heads 32, 33 are parallel to the reference plane of the disk 31, whereupon recording and play back can take place.

However, when the stable position of the magnetic heads relative to the disk is assumed by lowering of the lower magnetic head 33, the corner 32a of the upper magnetic head 32 adjacent to the hinge 35, preceding the other portions of the upper magnetic head 32, is brought into contact with the disk 31. At that time, since the arm 34 is pressed by the coil spring 37, all of the load pressure of the coil spring 37 is exerted concentratedly on this corner 32a, thus impairing the disk 31.

SUMMARY OF THE INVENTION

It is an object of the present invention to provide a magnetic head assembly of the upper-fixed lower-movable type which can ensure the accuracy of the reference plane and improve its read/write characteristic of enhancing the read tracking performance.

With the foregoing conventional problems in view, it is an object of the present invention to provide a magnetic head assembly of the upper-fixed-lower-movable system which is free from risk of damaging of a disk when loading.

To achieve the foregoing object, the present invention provides a magnetic head assembly which comprises a carriage on which a first magnetic head is mounted for performing read/write with respect to one side of the disk, a second magnetic head mounted opposite to the first magnetic head for performing read/write with respect to the other side of the disk, and a hold case coupled pivotably via a leaf hinge spring to the carriage, wherein the first magnetic head is attached via a gimbal spring to the carriage, and the second magnetic head is secured to the hold case, and is characterized in that the carriage has a support portion abutting directly on the hold case inclusive of the leaf hinge spring to support the same, so that the hold case is supported turnably with the support portion serving as a supporting point, whereby the reference plane of the hold case is defined by the support portion, so that accuracy can be ensured for the reference plane of the second magnetic head with respect to the disk, and the enhanced tracking performance can contribute to an improvement of the read/write characteristic.

DESCRIPTION OF THE PREFERRED EMBODIMENT

Figure 1:
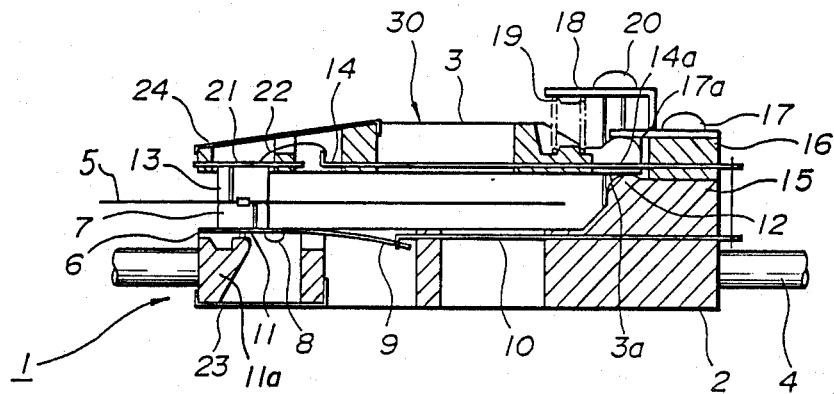
FIG. 1 is a sectional view of a magnetic head assembly according to the present invention.
Figure 2:
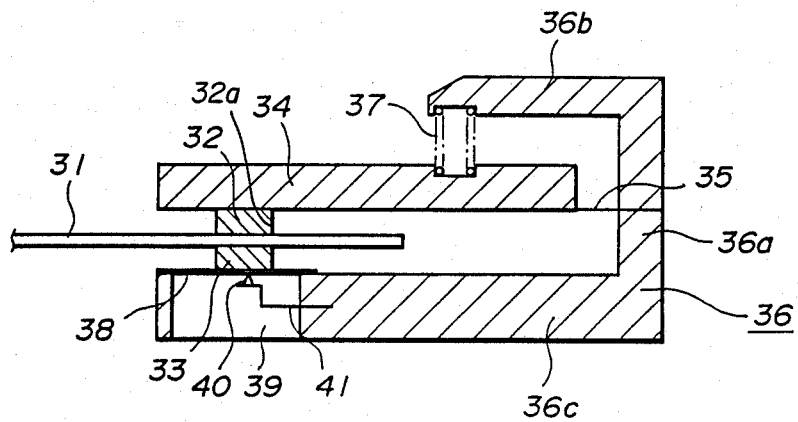
FIG. 2 is a sectional view showing one prior system.

According to the present invention, there is provided a magnetic head assembly comprising a carriage carrying a first magnetic head for reading and storing information on one surface of a disc-shaped magnetic recording medium, and a hold case carrying a second magnetic head for reading and storing information on the other surface of the magnetic recording medium and pivotably connected to the carriage via a leaf hinge spring. The first magnetic head is attached to the carriage via a gimbal spring with a pivot of its rear side, while the second magnetic head is fixed to the hold case. The pivot is non-resiliently supported at the carriage side and is disposed against the rear surface of the gimbal spring.

An embodiment of the present invention will now be described with reference to the drawing.

FIG. 1 is a sectional view of a magnetic head assembly which is the embodiment of the present invention. In this drawing, the magnetic head assembly is composed principally of a lower magnetic head assembly 1 and an upper magnetic head assembly 30, and is shifted in the radial direction of a disk 5 along a guide shaft 4 by means of a pulse motor not shown.

The lower magnetic head assembly includes a carriage 2, a lower magnetic head 7 mounted on the end of a gimbal spring 6, a flexible printed-circuit board 9 connected to a lead wire 8 extending from the magnetic head 7, and a lead terminal 10 connected to the flexible printed-circuit board 9 and carried on the base end side of the carriage 2. The lead terminal 10 formed by conductive metal plate, which is cut into sections, and insert-molded in the base end of the carriage 2 by the use of insulating synthetic resin, such that one end extends close to the gimbal spring 6. The carriage 2 is formed further with a pivot 11 which abuts on the under surface of a magnetic head (7) attaching portion of the gimbal spring 6 to ensure abutment of the head on the disk 5. The carriage base has a support portion 12 having a cylindrical surface with abuts directly on a hold case 3 hereinafter described to support the same.

The pivot 11 is formed on a distal end of a pivot supporting portion 11a formed of the non-resilient insulating synthetic resin integrally with the carriage 2.

The upper magnetic head assembly 30 includes the hold case 3, a stop plate 16, and a leaf hinge spring 14 for supporting turnably the hold case 3 against the stop plate 16, with an upper magnetic head 13 being secured via a plate 21 on the hold case 3 at a position opposite to the lower magnetic head 7 on the side of the carriage 2. On the hold case 3 a load spring 19 mounted from a cap plate 18 also abuts a push elastically the hold case 3 toward the carriage 2. The strength of elasticity can be adjusted optimally by a load pressure adjusting screw 20 equipped on the cap plate 18.

The plate 21 and leaf hinge spring 14 provided on the upper magnetic head assembly 30 are made, for example, by insert-molding one sheet of conductive spring material and cutting into given shapes. The leaf hinge spring 14 has one end positioned in the vicinity of the plate 21 of non-elastic structure, and functions also as a lead terminal by cutting it, for example, into five sections and connecting to the ends thereof five lead wires 22 extending from the magnetic head 13 attached by a bonding agent to the plate 21. That is, among the five lead wires 22 extended, three are used for read/write operation and two for erase operation. Although in the embodiment illustrated the leaf hinge spring is cut into five sections and formed through insert-molding so as to serve both as the hinge spring and lead terminal, it is of course possible to insert-mold one hinge spring and to provide a lead terminal independent of the former. To the under surface of the lower magnetic head (7) mounting portion and to the upper surface of the upper magnetic head (13) mounting portion, shielding plates 23 and 24 are attached, respectively, to protect the assembly against noise.

A receiving portion 3a of the hold case 3 projects in the sidewise direction of a hinge portion 14a of the leaf hinge spring 14 and abuts the support portion 12 so that the hold case 3 is turnable along the cylindrical surface of the support portion 12. Thus, the height/position of the hold case 3 is defined by the height of the abutting portion of the support portion 12, the attached height of the stop plate 16 of the leaf hinge spring 14, and the attached height of the stop plate 16 to a base portion 15 of the carriage 2. The stop plate 16 is, after its height from the support portion 12 is set optimally, secured to the base portion 15 by an attaching screw 17. A cap plate 17a, attached to the upper portion of the stop plate 16 by means of the attaching screw 17 and projecting over the upper portion of the receiving portion 3a, prevents fluctuation in height of the hold case 3 which would otherwise occur due to vibration or shock from the outside, thereby to prevent the magnetic heads 7 and 13 from being damaged.

By supporting the hold case 3 pivotably by means of the leaf hinge spring 14 and setting the height of the plane of the hold case 3 by means of the support portion 12 provided on the carriage 2, the height of the reference plane for the position of the upper magnetic head 13 is defined; thus, the accuracy of the reference plane is enhanced, as a result, the read/write characteristic can be improved correspondingly due to enhancement of the tracking performance.

In the embodiment illustrated, the plate 21 and leaf hinge spring 14 are made first in the form of a single body of one spring plate through insert-molding, and then the single body is cut at given spots into the separate plate 21 and leaf hinge spring 14. If both parts are formed in the manner above, the leaf hinge spring 14 and plate 21 are formed and situated on the same plane; thus, the reference plane of the upper magnetic heap 13 is defined by the under surface of the plate 21 and leaf hinge spring 14, and an enhancement of the accuracy of positioning the magnetic head 13 can be expected.

According to the described embodiment, partly because both the pivot 11 and the pivot supporting portion 11a are formed of non-resilient and insulating synthetic resin material integrally with the carriage 2, the reference position of the lower magnetic head 7 is not changed even when the hold case 3 is urged downwardly by the resilience of the load spring 19, so that the upper magnetic head 13 is normally parallel to the plane of the disk 5 and the lower magnetic head 7 when the upper magnetic head 13 abuts against the disk 5. Therefore, the corner (corresponding to the corner 32a in the conventional construction) of the upper magnetic head 13 is prevented from abutting against the disk 5 when loading, thereby avoiding damage to the disk 5.

Further, in the embodiment illustrated, the head terminal 10 of the carriage 2 and the leaf hinge spring 14 serving also as the lead terminal of the hold case 3 are formed individually through insert-molding. The metal plates serve also as individual core members of the carriage 2 and hold case 3, and are substantially identical in thermal expansion coefficient; thus, the effect can be expected that the off-track phenomenon caused by heat is suppressed.

Furthermore, in the embodiment illustrated, by extending one end of the lead terminal 10 insert-molded in the carriage 2 up to the vicinity of the gimbal spring 6, it is possible to shorten the flexible printed-circuit board 9; thus, the cost can be reduced.

Although in the embodiment the support portion 12 supports directly the under surface of the receiving portion 3a projecting from the base portion of the hold case 3; in a different configuration wherein the leaf hinge spring 14 is disposed so that it is exposed on the under surface of the hold case 3, it is possible to make the under surface of the leaf hinge spring 14 abut directly on the support portion 12 thereby to support the hold case 3. In either configuration, the hold case 3 turns along the surface of the support portion 12 and the leaf hinge spring 14 bends so as to assume the form of a circular arc of large curvature; thus, a concentration of stress does not appear in the leaf hinge spring 14, no risk of damage occurs in the normal operation, and the intended performance can be exerted stably over a long term.

As described hereinabove, the magnetic head assembly of the upper-fixed lower-movable type according to the present invention is provided with the support portion for supporting the hold case, so that the reference plane of the upper magnetic head can be defined at a high degree of accuracy and the operation characteristic can be improved in compliance with an enhancement of the tracking performance.

With this arrangement, since the lower magnetic head is supported on the non-resilient pivot via the gimbal spring, the height of the lower magnetic head is kept constant when either unloading or loading, so that the upper and lower magnetic heads remain parallel to each other in such position, thus guaranteeing the disk free from any damage.

What is claimed is:

1. A magnetic head assembly comprising:
   a lower carriage slidably mounted on a fixed lateral guide shaft for movement in a horizontal direction thereon, said carriage having a forward portion, on which a first magnetic head is mounted by a gimbal spring, a rear base portion disposed rearwardly in the horizontal direction from said forward portion and defining a first height above the guide shaft, and a support portion disposed forwardly of and adjacent to the base portion and having a cylindrically curved abutting surface with an upper point thereof defining a second height above the guide shaft;
   an upper hold case having a forward portion, on which a second magnetic head is mounted opposite to the first magnetic head of the lower carriage, and a rear receiving portion by which the hold case is pivotably mounted to the base portion of the carriage, so that the forward portion of the hold case can be lowered toward the forward portion of the carriage with the first and second magnetic heads in contact along a first reference plane with opposite sides of a magnetic recording medium interposed therebetween;
   a leaf hinge spring having a rear portion fixed to the base portion of the carriage at the second height by means of a stop plate securing said leaf hinge spring rear portion on the base portion, and a forward portion fixed to the receiving portion of the hold case;
   a cap plate secured on top of the stop plate and extending in a horizontal direction at a third height over the receiving portion of the hold case fixed to the leaf hinge spring secured to the base portion of said carriage; and
   the receiving portion of the hold case having an upper surface turnably abutting with the cap plate extending thereover, and a lower surface turnably abutting on said cylindrically curved abutting surface of said support portion of the carriage,
   wherein the rear portion of the hinge spring secured at the second height to the base portion of the carriage, the upper surface of the receiving portion abutting the cap plate at the third height, and the lower surface of the receiving portion abutting on the cylindrically curved abutting surface of the support portion at the second height of the upper point thereof all serve to define a second reference plane in which the hold case extends in the horizontal direction and by which the first reference plane between the first and second magnetic heads can be accurately defined.

2. A magnetic head assembly according to claim 1, wherein said leaf hinge spring serves also as a lead terminal of said second magnetic head.

3. A magnetic head assembly according to claim 1, wherein said first and second magnetic heads are protected against noise by shielding plates.

4. A magnetic head assembly according to claim 1, further including a load spring normally urging said hold case toward said carriage.

5. A magnetic head assembly according to claim 1, wherein a pivot is provided on the forward portion of the carriage bearing non-resiliently against a rear side of the gimbal spring mounting the first magnetic head to define the position of the first magnetic head with respect to the first reference plane.

* * * * *

UNITED STATES PATENT AND TRADEMARK OFFICE
CERTIFICATE OF CORRECTION

PATENT NO. : 4,831,479

DATED : May 16, 1989

INVENTOR(S) : Ichiro Noguchi, et al

It is certified that error appears in the above-identified patent and that said Letters Patent is hereby corrected as shown below:

On the title page:

In the Abstract

Line 3, change "face" to --side--;

Line 4, delete "also" and "on the carriage";

Line 6, change "face" to --side--;

Line 7, change "turnably" to --pivotably--;

Line 13, change "turnably" to --pivotably--;

Line 14, change "supporting" to --reference--;

Delete lines 15-20, beginning with "of the hold" and insert-- of the second magnetic head mounted to the hold case is defined by the support portion. The reference plane of the first magnetic head is defined by a non-resilient pivot on which a gimbal spring mounting the head is supported. The accurate definition avoids damage to the disk and enhances the tracking performance, thereby improving--.

Signed and Sealed this

Seventeenth Day of July, 1990

*Attest:*

HARRY F. MANBECK, JR.

*Attesting Officer*  *Commissioner of Patents and Trademarks*